United States Patent [19]

Ryder et al.

[11] 4,076,855
[45] Feb. 28, 1978

[54] SOLUBLE COFFEE PROCESS

[75] Inventors: William S. Ryder, Orangeburg; Joseph F. Mezzino, Pearl River, both of N.Y.

[73] Assignee: General Foods Corporation, White Plains, N.Y.

[21] Appl. No.: 333,100

[22] Filed: Feb. 16, 1973

[51] Int. Cl.$^2$ .................................................. A23F 1/08
[52] U.S. Cl. ............................................................ 426/594
[58] Field of Search ............... 426/432, 434, 373, 442, 426/342, 495, 366, 354, 594, 595

[56] References Cited

U.S. PATENT DOCUMENTS

| | | | |
|---|---|---|---|
| 2,712,501 | 7/1955 | Hale et al. | 426/366 |
| 3,151,985 | 10/1964 | Fobes | 426/366 X |
| 3,644,122 | 2/1972 | Yeransian | 426/388 X |
| 3,705,810 | 12/1972 | Lendvay | 426/432 X |
| 3,787,590 | 1/1974 | Borders et al. | 426/366 |

OTHER PUBLICATIONS

"Coffee Processing Technology, " vol. 2, by Sivetz, published by Ari Pub. Co., 1963, Westport, Conn., p. 120.

"Coffee Processing Technology", vol. 1, by Sivetz and Foote, published by Avi Pub. Co., Westport, Conn., p. 480.

The Condensed Chem. Dictionary, (7th ed.), by Rose, published by Reinhold Book Corp., 1966, p. 57.

*Primary Examiner*—Frank W. Lutter
*Assistant Examiner*—Jon Hokanson
*Attorney, Agent, or Firm*—Thomas R. Savoie; Bruno P. Struzzi

[57] ABSTRACT

Constituents of coffee extract which are normally insoluble are solubilized by a process involving removing the constituents from the coffee extract and adding an alkaline material to a dispersion of the constituents in an amount sufficient to raise the pH of the dispersion to at least about 7.0.

4 Claims, No Drawings

SOLUBLE COFFEE PROCESS

BACKGROUND OF THE INVENTION

This invention relates to the manufacture of soluble coffee and more particularly to a process for treating insolubles obtained from soluble coffee extract to render them soluble and thus provide higher yields for the overall process.

In the manufacture of soluble coffee, coffee extracts are obtained by contacting the coffee material with an extraction medium so as to extract soluble solids. For example, percolation techniques are normally employed to extract soluble solids from roasted and ground coffee on a commercial scale.

The coffee extracts obtained from such extraction processes generally contain considerable amounts of material which is relatively insoluble except in high temperature mediums. In the manufacture of coffee extracts, the insolubles may contain hydrolysis products produced during the later stages of percolation, some roasted and ground coffee fines carried off by the extract, and other insoluble complexes. Though some of these insolubles are soluble to a degree in heated mediums, these insolubles present particular problems when drying methods such as low-temperatures spray-drying or freeze-drying are employed, methods necessitating cooling of the coffee extract. It is generally a common practice to remove these insolubles to avoid plugging problems in the various pieces of processing equipment and also the appearance of "specks" of insoluble material in the eventually reconstituted product. Since coffee extract will generally be associated with the insolubles which are to be removed, centrifuging is a preferred separation method since it effectively separates a substantial amount of extract liquid from the insolubles.

In the soluble coffee process, the removal of these insoluble materials is, in effect, a removal of coffee solids and, hence, results in the waste of desirable constituents. In some cases, a loss of 10% coffee solids has been noted. Further, certain of the constituents comprising the insoluble matter may impart and contribute to desirable organoleptic properties in the reconstituted beverage.

Accordingly, it is an object of this invention to treat the insolubles found in extracts of coffee to enable their use in the final coffee product.

Other objects will become apparent upon reading the specification and claims which follow.

SUMMARY OF THE INVENTION

In accordance with this invention it has been found that the constituents of coffee extract which are normally insoluble are rendered soluble by a process involving removing the constituents from a coffee extract and adding an alkaline material to a dispersion of the constituents in an amount sufficient to raise the pH of the dispersion to at least about 7.0.

The constituents so treated are found to be soluble even in relatively cold water and their reincorporation into the coffee extract from which they were removed results in an increased yield of soluble coffee solid for the overall process.

It is found that by first removing the insoluble constituents from the coffee extract, the amount of alkaline material needed is relatively small compared to that needed if the alkaline material were to be added to the entire body of coffee extract itself. Thus, when reincorporation of the now solubilized constituents is made into a coffee extract from which these constituents were removed, it is found that the amount of alkaline material relative to the amount of coffee extract is extremely small. As such, the final coffee product is found to have no noticeable traces of the alkaline material nor a significant increase in its original pH. The process of this invention, then, avoids having to re-adjust the pH of the coffee extract with acidic material in order to return it to its original pH.

By the process of this invention, a substantial portion of the originally insoluble constituents are solubilized. In instances where not all of the constituents are solubilized it is preferred to subject the dispersion having the alkaline material added thereto to an operation which will remove any remaining insolubles before reincorporation of the solubilized constituents into the coffee extract from which they were removed.

Alkaline materials which are particularly effective in the process of this invention are ammonium carbonate, potassium hydroxide and ammonium hydroxide. In our preferred method of operation, ammonium carbonate is found to be particularly useful.

As stated previously, the amount of alkaline material employed is such that the pH of the dispersion of insoluble constituents being treated is raised to a pH of at least about 7.0. While the insoluble constituents are also solubilized when larger amounts of alkaline material are used, the amount used is generally balanced against the desirability of precluding significant increases in the pH of the coffee extract to which these now soluble constituents are added and also the avoidance of noticeable organoleptic traces of the alkaline material in the final product. In general, upper limits on the amount of alkaline material added may be set by the desirability of keeping the pH of the dispersion being treated below about 9.0.

DETAILED DESCRIPTION OF THE INVENTION

In the process of this invention, an aqueous coffee extract is obtained through standard extraction techniques. An example of such a technique is percolation of the semi-continuous counter-current contacting of roasted and ground coffee with an extraction liquid. In the case of coffee, the extract obtained from the extraction process is generally drawn-off to a scale or weighing tank from which it is pumped to the subsequent processing and drying operations. The extract pumped from this tank may contain insoluble materials, particularly when the extract has been allowed to cool. When the ultimate drying method to be employed is a low-temperature method such as freeze-drying and low-temperature spray-drying, necessitating cooling of the coffee extract, the insoluble materials are particularly troublesome since clogging or plugging of flow lines, orifices, etc. may occur. Even if the extract is subjected to high temperature processing and thereby better solubilization of some of these insolubles, removal is desirable so as to avoid "specks" of insoluble matter in the eventually reconstituted beverage caused by truly insoluble materials.

According to the process of this invention, these insoluble constituents are rendered soluble by adding to an aqueous dispersion thereof an alkaline material sufficient to raise the pH of said dispersion to at least about 7.0. While we do not wish to be limited by such, it is believed that some reaction between the alkaline material and the complexes making up the insoluble constituents occurs, breaking down the complexes into soluble forms.

In the process of this invention, coffee extract obtained from the extraction process is subjected to an operation which will remove the insoluble constituents contained therein. Centrifugation is the preferred means for accomplishing the separation. Since some of the insoluble constituents are soluble to some extent in hot mediums, it is generally preferred to cool the coffee extract prior to centrifugation so that most of the insoluble materials may be removed from the extract. As mentioned previously, where low-temperature drying methods are to be employed to obtain the final dry soluble coffee product, the extract will normally have already been cooled to a certain extent. For example, it is common practice in percolation to keep the extract finally drawn off from the percolators below a temperature of about 210° F. Also, in freeze-drying, it is desired to keep the temperature of the coffee extract relatively low so as to avoid the loss of flavorful volatile aromatics, say below about 110° F. As such, further cooling when the process of this invention is employed is generally unnecessary in such instances. It should be noted, however, that the process of this invention solubilizes constituents which remain insoluble even in heated mediums; further, cooling the coffee extract before insoluble constituent removal serves only to effect removal of as much insoluble matter as possible and practical considerations such as the economics and manufacturing feasibility of substantial cooling versus the amount of insolubles removed will generally serve as guidelines as to the extent that the extract is to be cooled, if it be cooled at all.

In general, The material obtained from this separation process consists of constituents insoluble at the temperature at which the separation process is performed together with a certain amount of aqueous extract which is associated with the insoluble constituents. Thus, a dispersion of the insoluble constituents is normally obtained. It is possible, however, to operate the insolubles separation apparatus so as to remove only the insoluble constituents with only minor amounts of aqueous extract. When such is the case, coffee extract or water may be added to the insolubles to form the above-mentioned dispersion. To this dispersion is added an alkaline material such that the pH of the dispersion is raised to at least about 7.0. The alkaline material may be added in any concentration though it is generally desirable to employ rather dilute solutions, say, about 10 to 30%. The actual amount of alkaline solution added to the dispersion is dependent upon the concentration of the alkaline solution, the amount of insoluble material being treated and other like factors. It is found, however, that the amount should be such that the pH of the dispersion of insoluble materials is raised to at least about 7.0.

The alkaline materials which may be used in accordance with this invention may be, for example, ammonia, its hydroxides or carbonates, the hydroxides, carbonates or bicarbonates of the alkaline earth metals or alkali metals, or mixtures of these. In our preferred embodiments, ammonium carbonate, potassium hydroxide, and ammonium hydroxide are found particularly useful, with ammonium carbonate being the most preferred. When using ammonium carbonate it is found that the material decomposes readily to produce ammonia and carbon dioxide which will therefore preclude carry over of these materials into the final coffee product. In certain instances the decomposition will occur merely by virtue of the heat of the coffee extract when reincorporation of the now soluble constituents with the ammonium carbonate takes place. Where, however, the temperature of the coffee extract is too low to effect decomposition of the ammonium carbonate, it is found that heating the dispersion of insolubles after the addition of ammonium carbonate but before reincorporation into the coffee extract is effective. Also, drying operation such as spray-drying are usually operated at temperatures sufficient to effect decomposition.

It is important to note, however, that, according to the process of this invention, even if the alkaline material is allowed to remain in the coffee extract, no noticeable increase in the pH of the extract is observed nor any alteration of the taste of the coffee extract. Due to the separation and separate treatment of the insoluble constituents apart from the coffee extract, relatively small amounts of alkaline material are needed to effect solubilization. When reincorporation is made, the amount of alkaline material becomes even smaller relative to the entire body of coffee extract.

As previously mentioned, the process of this invention is effective in solubilizing a major amount of the normally insoluble constituents of coffee extract. It is noted, however, that certain of these insolubles will remain so even after treatment in accordance with this invention. When the amount of such remaining insoluble material is relatively large, separation of these from the now solubilized constituents is preferred. Centrifugation, decantation or other like methods are effective for accomplishing such a separation.

The following Examples are provided to describe specific embodiments of this invention and are not intended to be limiting in any way.

EXAMPLE I

Fifteen hundred pounds (1500 lbs.) of coffee extract was delivered to a centrifuge. During centrifugation, approximately 250 lbs. of extract having the insoluble constituents removed was collected and stored. The recovered dispersion of insoluble material was at a 27% solids concentration by weight and at a pH of 5.01, and a total weight of 53 pounds. Five percent of this recovered material was adjusted to pH 7.1 with a 20% ammonium carbonate solution and added to 75 pounds of the coffee extract from which the insolubles were removed. The total amount of ammonium carbonate added represented 0.047% by weight of the total extract (Sample 2). A control sample of 75 pounds of the coffee extract was obtained (Sample 1), together with 75 pounds of coffee extract having added back thereto an amount of the insoluble material equal to the amount in Sample 2; however, no alkaline material was added to this insoluble material (Sample 3).

Each of the above samples were frozen solid and freeze-dried for 22 hours. After freeze-drying, the materials were kept at −20° F. Yields were 1933 grams for Sample 1, 1966 grams for Sample 2, and 1995 grams for Sample 3.

An expert taste panel found no appreciable differences among the taste of three reconstituted samples and no off-flavors were detected in Sample 2. Sample 1 was found to be free of insoluble materials when reconstituted while Sample 2 had some insolubles at the bottom of the cup. Sample 3 was found to have an intolerable amount of insoluble "specks" both at the bottom and the top of the cup. The pH of reconstituted Sample 1 was 5.06 as was Sample 3. Sample 2 had a pH of 5.12. Free ammonia measurements showed an increase of only 0.02% in Sample 2 over Sample 1.

EXAMPLE II

As in Example I, coffee extract was centrifuged and the blowdown from the centrifuge was found to contain 32 lbs. of insolubles plus 96 lbs. of extract. Forty two grams of the insoluble material was combined with 126 grams of the extract and a 20% solution of ammonium carbonate was added (1.76 gms.) to raise the pH of the dispersion to 7.0. The mixture was then centrifuged to remove any remaining insoluble materials and added back to 5000 ml of the centrifuged extract from which the insoluble materials was obtained. The mixture was then freeze-dried. Reconstituted samples of this freeze-dried mixture were compared against a control sample of centrifuged coffee extract. The pH of the control was 4.8 while the pH of the experimental sample was 5.0. Both the control and the experimental sample were free of insoluble materials and both contained identical amounts of free ammonia.

As can be seen from the above examples, the process of this invention affords a means of increasing the yields of soluble coffee processes without imparting any undesirable characteristics to the final coffee product. Obvious variations in this process are believed ascertainable to those skilled-in-the-art without departing from the scope and spirit of this invention.

We claim:
1. A soluble coffee process which renders soluble normally insoluble constituents of coffee extract comprising the steps of:
   a. obtaining a coffee extract,
   b. removing said insoluble constituents from the coffee extract,
   c. adding to an aqueous dispersion of said constituents an alkaline material in an amount sufficient to raise the pH of said dispersion to at least about 7.0 but below 9.0,
   d. incorporating the alkaline-containing dispersion into a coffee extract from which insolubles have been removed, and then
   e. drying the extract of step (d).
2. The method of claim 1 wherein any unsolubilized constituents are removed from said dispersion having alkaline material added thereto prior to reincorporation of said dispersion into said coffee extract.
3. The method of claim 1 wherein said alkaline material is selected from the group consisting of ammonium carbonate, potassium hydroxide, and ammonium hydroxide.
4. The method of claim 3 wherein said alkaline material is ammonium carbonate.

* * * * *

UNITED STATES PATENT AND TRADEMARK OFFICE
CERTIFICATE OF CORRECTION

PATENT NO. : 4,076,855
DATED : February 28, 1978
INVENTOR(S) : William S. Ryder et al.

It is certified that error appears in the above-identified patent and that said Letters Patent are hereby corrected as shown below:

In column 2, line 43, after "percolation" delete "of" and insert -- or -- .

In column 4, line 59, change "1966 grams" to -- 1996 grams -- .

In column 5, line 16, change "materials" to -- material -- .

Signed and Sealed this

Eleventh Day of July 1978

[SEAL]

Attest:

RUTH C. MASON
Attesting Officer

DONALD W. BANNER
Commissioner of Patents and Trademarks